(12) United States Patent
Jen (10) Patent No.: US 7,269,307 B2
(45) Date of Patent: Sep. 11, 2007

(54) OPTICAL CONFIGURATION FOR GENERATING POLARIZATION CONVERSION

(76) Inventor: Yi-Jun Jen, 3F., No 23, Yi 6th Rd., Sinyi District, Keelung City 201 (TW)

( * ) Notice: Subject to any disclaimer, the term of this patent is extended or adjusted under 35 U.S.C. 154(b) by 0 days.

(21) Appl. No.: 11/387,015

(22) Filed: Mar. 22, 2006

(65) Prior Publication Data
US 2007/0103764 A1    May 10, 2007

(30) Foreign Application Priority Data
Nov. 7, 2005    (TW) .............................. 94139075 A (51) Int. Cl.
*G02B 6/00*    (2006.01)
(52) U.S. Cl. ........................................ 385/11; 385/122
(58) Field of Classification Search ................ 359/328, 359/489; 369/112.19; 385/11, 122, 130
See application file for complete search history.

(56) References Cited

U.S. PATENT DOCUMENTS

| 5,033,810 | A | * | 7/1991 | Inoue et al. ................. 359/328 |
| 5,671,206 | A | * | 9/1997 | Choi ..................... 369/112.19 |
| 6,067,193 | A | * | 5/2000 | Sekine et al. ............... 359/489 |

* cited by examiner

*Primary Examiner*—Quyen P Leung (74) *Attorney, Agent, or Firm*—Banger Shia (57) ABSTRACT

The present invention presents a method to enhance polarization conversion reflection from an anisotropic thin film. The total reflection effect or the high reflection at the interface of an anisotropic thin film leads to enhanced polarization conversion. Polarization conversion is an interesting phenomenon by which a fraction of p(s)-polarized light incident on an anisotropic thin film may be reflected as s(p)-polarized light.

7 Claims, 7 Drawing Sheets

OPTICAL CONFIGURATION FOR GENERATING POLARIZATION CONVERSION

FIELD OF THE INVENTION

The present invention relates to an optical configuration for generating polarization conversion, especially to enhance polarization conversion reflection from an anisotropic thin film for application to optical component and progressing the technique in measurement.

BACKGROUND OF THE INVENTION

The conventional technology applies interference effects in thin films to adjust the intensity and phase for different wavelengths, angles of incidence, and polarization states to meet the demands of various optical components, such as anti-reflection coatings, high-reflection coatings, beam splitters and band-pass filters. However, the components are limited by the fact that the polarization states of incident light and reflected light are the same. The present invention proposes a method that uses an anisotropic thin film system to generate strong polarization conversion. Polarization conversion from an anisotropic thin film was only discussed by Ian Hodgkingson et al. on the computational results of the air/anisotropic thin film/substrate system, but the reflectance was too small (less than $10^{-3}$), thus could be hardly measured and applied. Therefore, using thin film interference on polarization conversion and application was not proposed otherwise.

F. Yang and J. R. Sambles suggested using the boundary of an anisotropic optical medium to have polarization conversion reflectance, but it achieved low intensity of polarization conversion. Using anisotropic thin film here not only could enhance the polarization conversion ratio but also could design and fabricate multilayered system to have polarization conversion for specific wavelength range or incident angle range.

In measurement, the measurement of anisotropic optical constants (including the index of refraction, orientations of principal axes, and thickness) usually uses an ellipsometer as the main method. However, since ellipsometers are based on both intensity and phase measurements, its cost is very high. The optical-constants of the anisotropic film can be determined to have the anisotropic thin film in the module proposed in the present invention and measure polarization conversion reflectance versus angle of incidence and wavelength. This technology could enhance the detection sensitivity significantly, and save cost because it only measures intensity.

BRIEF DESCRIPTION OF THE INVENTION

The present invention presents a simple and practical method to result polarization conversion reflection by an optical configuration. Polarization conversion is a phenomenon by which a fraction of p(s)-polarized light incident on an anisotropic thin film may be reflected as s(p)-polarized light.

According to the present invention, an optical configuration for generating polarization conversion comprises:

It requires that at least two of the three principal indexes of the anisotropic thin film are different. It also requires that the principal axes coordinates are not coincident with the film surface coordinates.

A configuration is required to have total reflection or high reflection in the anisotropic thin film. For example, when total reflection occurs for the high-refractive incident medium/anisotropic thin film/low-refractive substrate system, it could raise the magnitudes of reflection coefficients of the rays internally reflected inside the anisotropic film.

The anisotropic thin film is arranged between the incident medium and the substrate. The enhanced ordinary ray and extraordinary ray coupling effect inside the anisotropic thin film lead to enhanced polarization conversion reflection: a large fraction of P(S)-polarized incident light is converted into S(P)-polarized reflected light.

In accordance with one aspect of the present invention, air and metal could be the low-refractive substrate of the optical configuration for polarization conversion.

In accordance with one aspect of the present invention, the change of measured polarization conversion along with wavelength and angle to determine the optical constants of anisotropic thin film; Prepare the anisotropic thin film in the module proposed in the present invention and measure polarization conversion reflectance versus incident angle or wavelength. The optical constants of anisotropic thin film can be derived by optimizing the measured data on computer. The optical constants of anisotropic thin film include principal indexes of refraction, directions of principal axes, and thickness.

This present invention presents to enhance polarization conversion reflection from an anisotropic thin film. The total reflection effect and the high reflection at the interface of an anisotropic thin film lead to enhanced polarization conversion.

P(S)-polarized light incident obliquely could be converted to S(P)-polarized light; the method includes a method of generated high reflection or total reflection inside the anisotropic thin film:

(1) Using the high-refractive incident medium (or equivalent multilayered stack) and the low-refractive substrate (or equivalent multilayered stack) could raise the magnitudes of reflection coefficients of the rays internally reflected inside the anisotropic film.

(2) It is necessary to have at least two of the three principal indexes of the anisotropic thin film are different. It also requires that the principal axes coordinates are not coincident with the film surface coordinates. (in FIG. 1). The different polarization conversion reflectance could be obtained by changing aspect of the incident plane.

Figure 2:
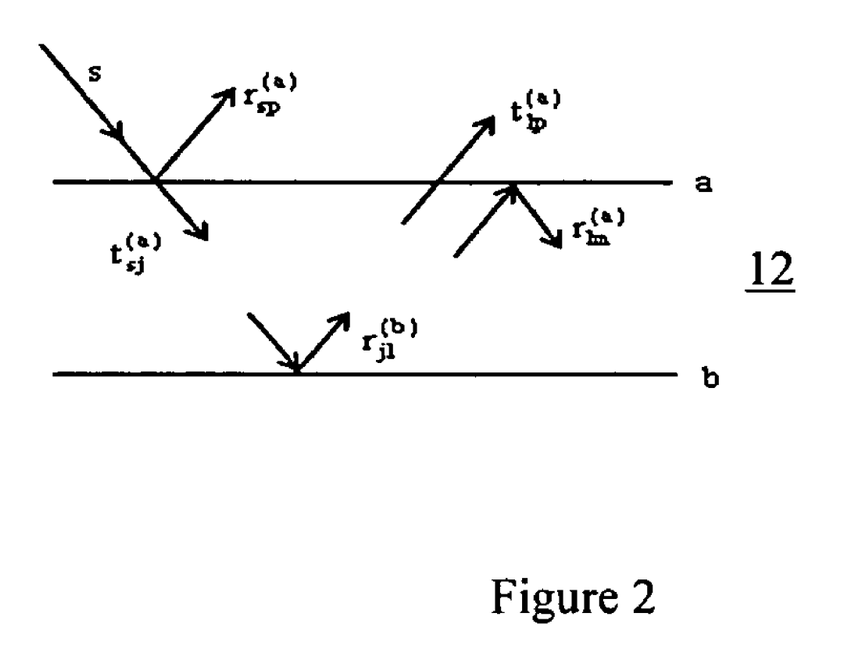
FIG. 2 shows the multiple reflection inside the anisotropic thin film j, l, m=e, o, of which e is extraordinary wave, o is ordinary wave, $r_{sp}^{(a)}$ is reflection coefficient for S-polarized incident light and P-polarized reflected light on (a) interface, $r_{eo}^{(b)}$ is reflection coefficient for extraordinary incident light and ordinary reflected light on (b) interface, $t_{se}^{(a)}$ is transmission coefficient for S-polarized incident light and extraordinary transmitted light on (a) interface; same for other symbols in the figure.

Based on the optical module, light would generate multiple internal reflection inside the anisotropic thin film, as shown in FIG. 2, this technology is as mentioned in (1); use high-refractive incident medium and use with low-refractive substrate to enhance the coupling effect between ordinary ray and extraordinary ray at the interface, in order to increase the polarization conversion reflectance for oblique incident case.

The isotropic and anisotropic thin films mentioned in (1) could be further designed so that the polarization conversion reacts differently to different wavelengths or angles, as shown in the following four examples.

Figure 3:
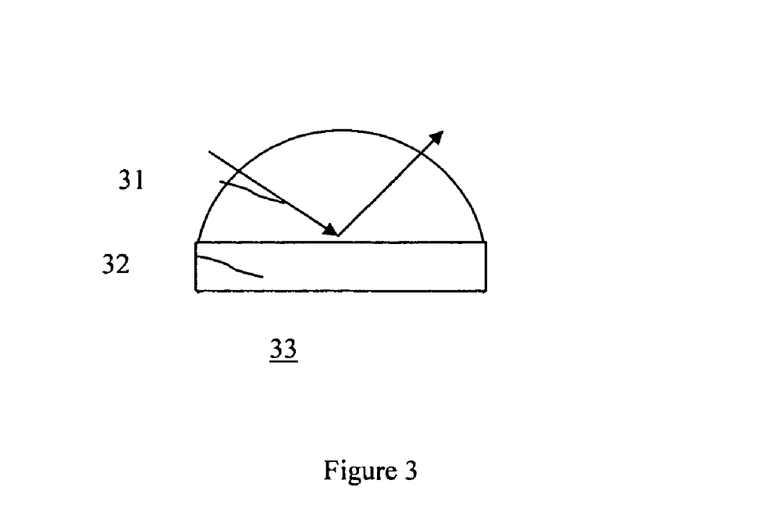
FIG. 3 shows the reflectance spectrum of the prism/anisotropic thin film/air system.
Figure 4:
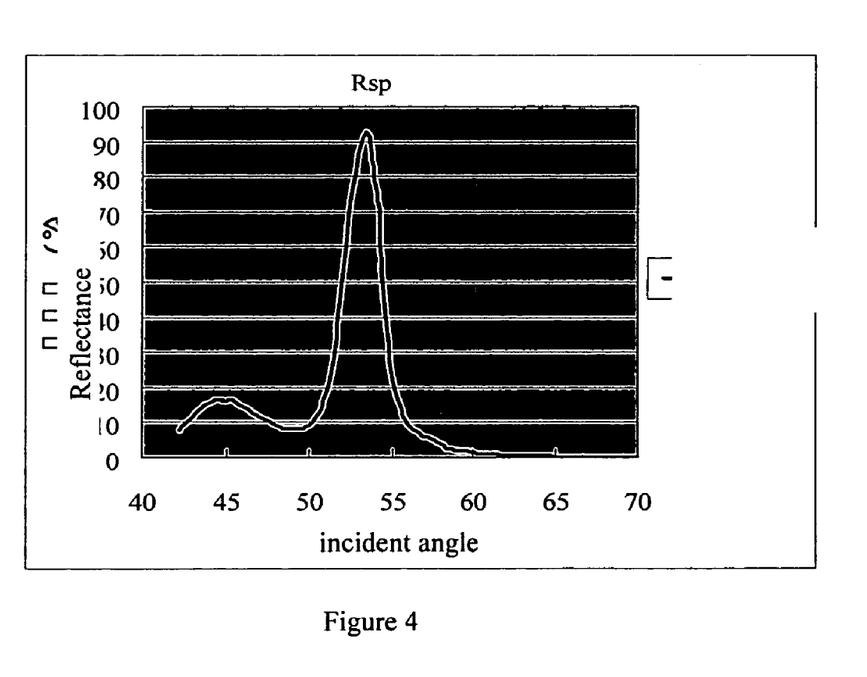
FIG. 4 shows the reflectance spectrum with incident angle.
Figure 5:
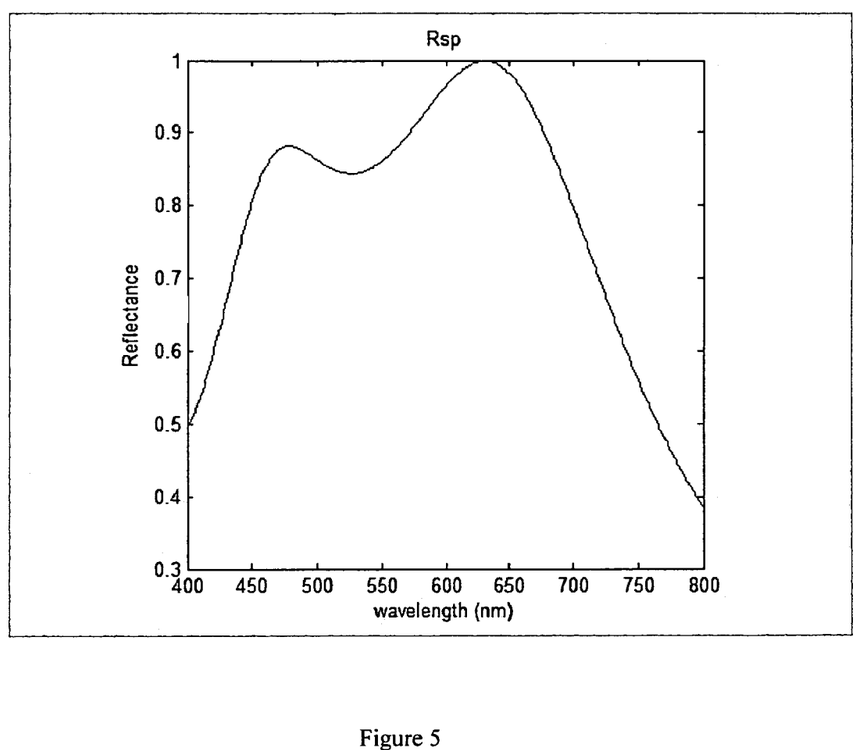
FIG. 5 shows the reflectance $R_{sp}$ spectrum with wavelength at an incident angle α=53.0 deg.

EX1. A typical anisotropic $MgF_2$ thin film is arranged in prism (BK7) that one of the principal axes at an angle of 45 deg to the normal of the interface. The principal indices of the anisotropic thin film are $n_1=1.280$, $n_2=1.253$ and $n_3=1.250$. The anisotropic $MgF_2$ thin film is 800 nm-thick. The s-polarized light of wavelength 632.8 nm propagates into the prism/anisotropic $MgF_2$ thin film/air system (In FIG. 3). Under this condition, the polarization conversion reflectance $R_{sp}$ is increased to 0.95 at the angle of incidence of 54 deg and the incident plane orientation δ=90 deg. FIG. 4 shows the spectrum of reflectance $R_{sp}$ versus incident angle. FIG. 5 shows the spectrum of reflectance $R_{sp}$ versus wavelength at the incident angle 54 deg. The polarization conversion reflectance varies with changing the principal indexes of refraction and the directions of the principal axes of the anisotropic thin film. The anisotropic thin film can be utilized to modulate the polarization of light at various wavelengths and angles of incidence.

Figure 6:
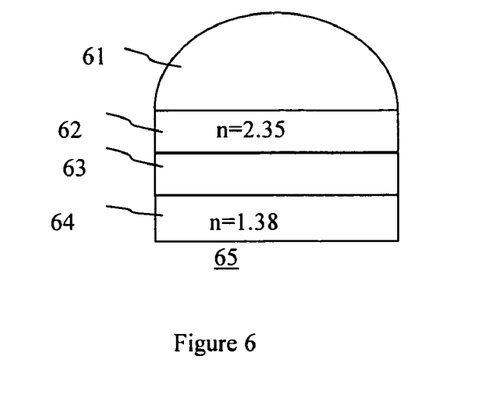
FIG. 6 shows the reflectance spectrum of the prism/isotropic ZnS thin film/anisotropic $MgF_2$ thin film/isotropic ZnS thin film/air system.
Figure 7:
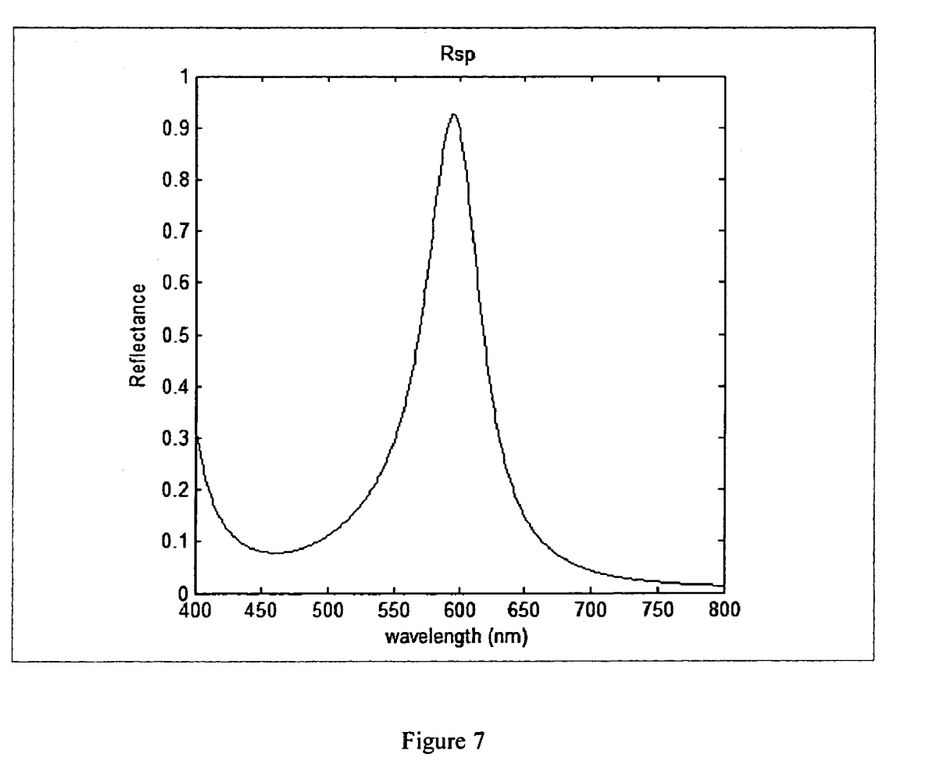
FIG. 7 shows the reflectance spectrum with wavelength at an incident angle α=53.0 deg and an incident orientation δ=90 deg (In FIG. 1)

EX2. Two isotropic thin films are arranged in a prism/isotropic ZnS thin film/anisotropic $MgF_2$ thin film (920 nm thick)/isotropic $MgF_2$ thin film/air system (In FIG. 6) to narrow the band reflection polarization conversion. (The refractive index of the ZnS thin film is 2.35 and the thickness is 73 nm; the refractive index of the isotropic $MgF_2$ is 1.38 the thickness is 220 nm). The other optical constants in the system are as well as EX1. FIG. 7 shows the reflectance $R_{sp}$ spectrum at the incident angle α=53.0 deg and the incident plane orientation δ=90 deg (In FIG. 1). The polarization conversion reflectance varies with changing the principal indexes of refraction and the directions of the principal axes of the anisotropic thin film. The anisotropic thin film can be utilized to modulate the polarization of light at various wavelengths and angles of incidence.

Figure 8:
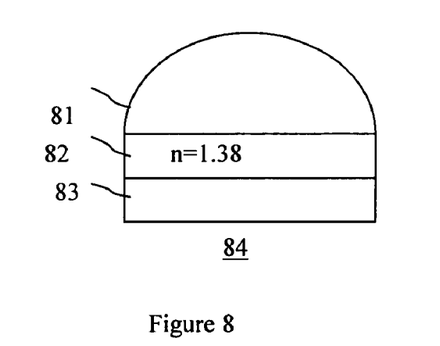
FIG. 8 shows the reflectance spectrum of the prism/isotropic $MgF_2$ thin film/anisotropic $MgF_2$ thin film/air system.
Figure 9:
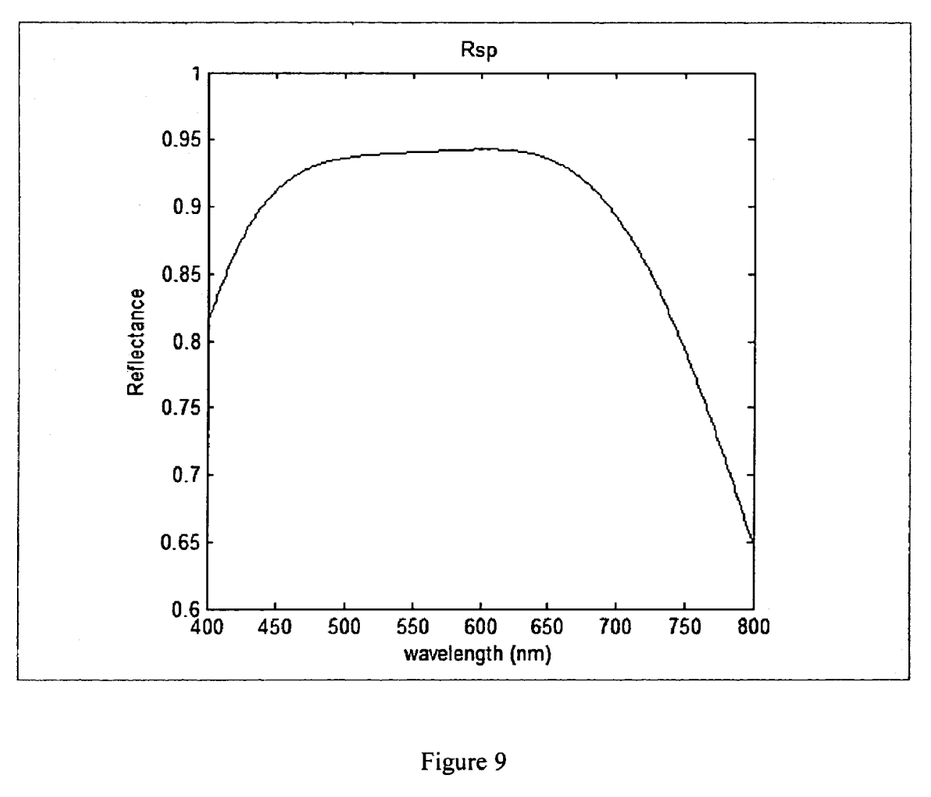
FIG. 9 shows the reflectance spectrum with wavelength at an incident angle α=54.0 deg and an incident orientation δ=90 deg (In FIG. 1)
Figure 10:
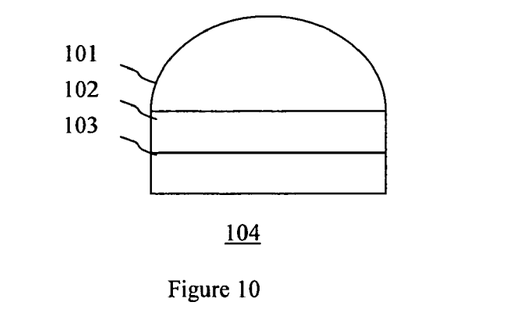
FIG. 10 shows the reflectance spectrum of the prism/anisotropic $MgF_2$ thin film/isotropic ZnS thin film/air system.

EX3. The broad-band polarization conversion reflection from the BK7 prism/isotropic $MgF_2$ thin film/anisotropic $MgF_2$ thin film (800 nm thick)/air system can be determined (In FIG. 8). The refractive index of the isotropic $MgF_2$ thin film is 1.38 and the thickness is 190 nm. The thickness and optical constants of the anisotropic $MgF_2$ thin film are as well as EX1. The polarization conversion reflectance $R_{sp}$ is increased with the angle of incidence of 54 deg and the incident plane orientation δ=90 deg (In FIG. 1). FIG. 9 shows the reflectance $R_{sp}$ spectrum. The polarization conversion reflectance varies with changing the principal indexes of refraction and the directions of the principal axes of the anisotropic thin film. The anisotropic thin film can be utilized to modulate the polarization of light at various wavelengths and angles of incidence.

Figure 11:
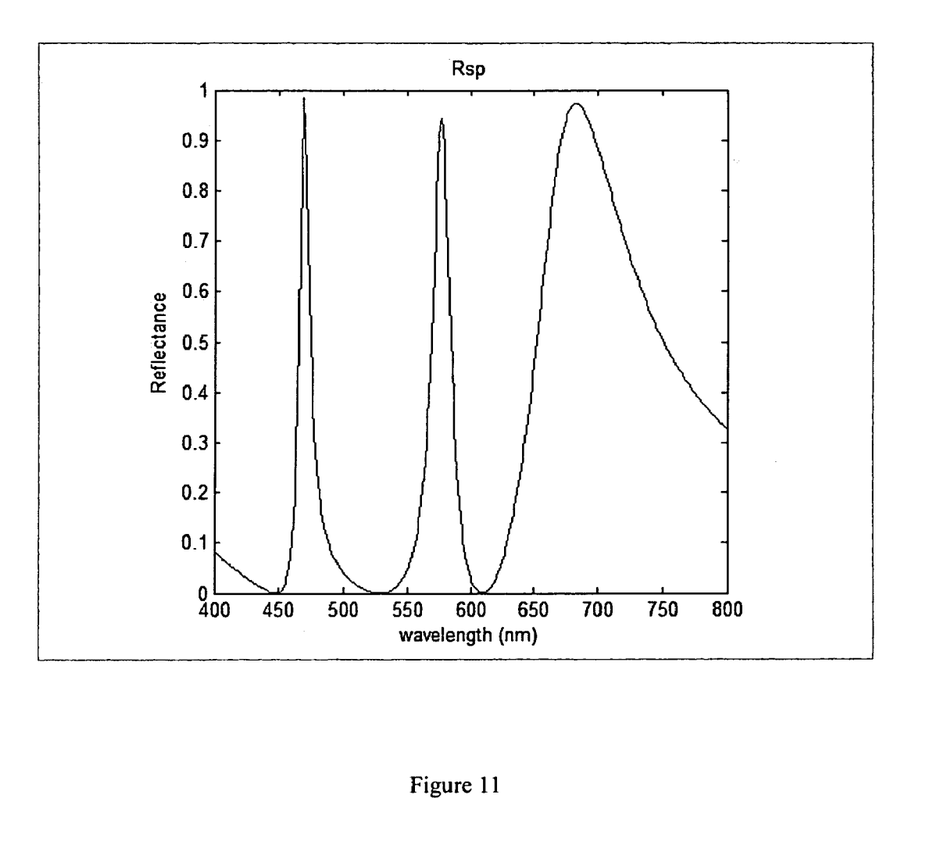
FIG. 11 shows the reflectance spectrum with wavelength at an incident angle α=56.7 deg and an incident orientation δ=90 deg.

EX4. The narrow-band polarization conversion reflection from the prism/anisotropic $MgF_2$ thin film (1700 nm thick)/isotropic ZnS thin film/air system (incident angle α=56.7 deg and incident plane orientation δ=90 deg). The refractive index of the isotropic ZnS thin film is 2.35 and the thickness is 170 nm and the other optical constants of the anisotropic $MgF_2$ thin film are as well as EX1. FIG. 11 shows the spectrum of reflectance $R_{sp}$ versus wavelength. The polarization conversion reflectance varies with changing the principal indexes of refraction and the directions of the principal axes of the anisotropic thin film. The anisotropic thin film can be utilized to modulate the polarization of light at various wavelengths and angles of incidence.

The present invention may best be understood through the following description with reference to the accompanying drawings, in which:

DETAILED DESCRIPTION OF THE PREFERRED EMBODIMENT

Figure 1:
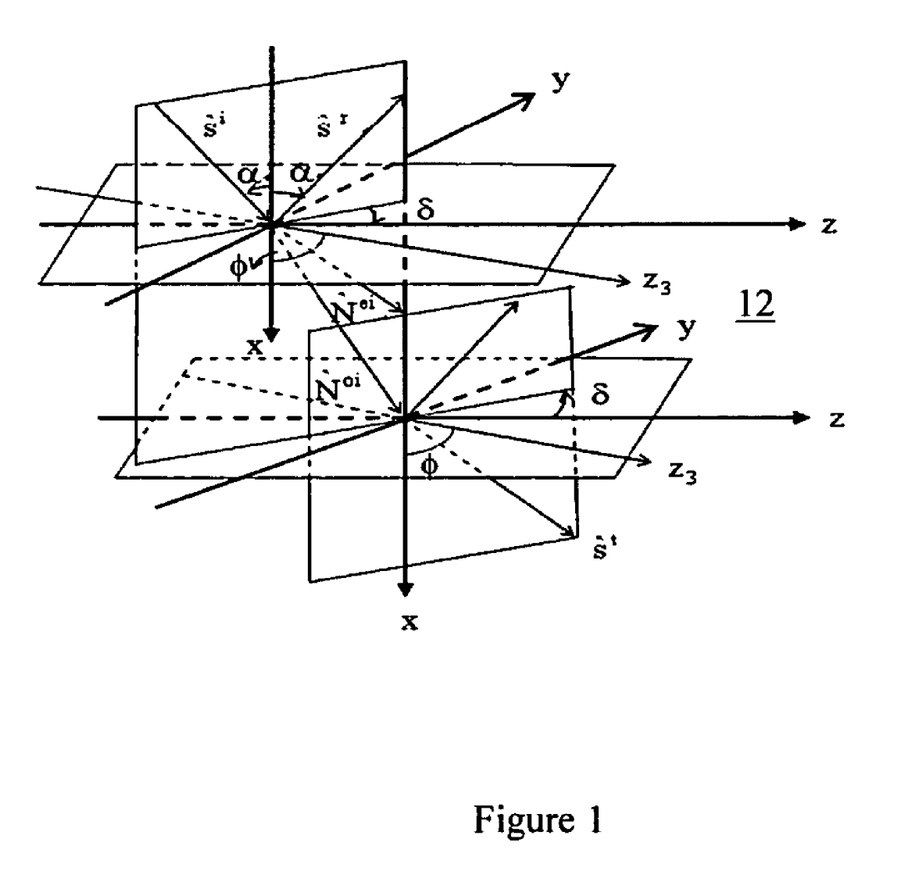
FIG. 1 shows the relationship between the directions of three principal axes ($z_1$, $z_2$, $z_3$) of anisotropic thin film 12 and coordinates (x, y, z) of the thin film system, $\hat{S}^i$, $\hat{S}^r$ and $\hat{S}^t$ are vectors of incident, reflected, and transmitted light, $\hat{N}^{oi}$ and $\hat{N}^{ei}$ are vectors of ordinary wave and extraordinary wave inside the thin film; δ is the position of incident plane, φ angle is the oblique angle of one of the principal axes.

Referring to FIG. 1, FIG. 1 illustrates coordinate system and normals to the wavefronts, wherein z3 is the optical axis, $\hat{S}^i$ is the incident ray, $\hat{S}^r$ is the reflected ray, $\hat{S}^t$ is the refracted ray, $\hat{N}^{oi}$ is the normal to ordinary refracted wavefront, and $\hat{N}^{ei}$ is the normal to extraordinary refracted wavefront. For x<0, the medium is isotropic while for x>0, the medium is uniaxial birefringent. In FIG. 1, an anisotropic thin film is marked as numeral "12".

In order to solve the boundary conditions at an interface formed by an isotropic medium and a birefringent crystal, two coordinate systems have to be considered, namely the systems x, y, z, defined with respect to the discontinuity surface so that x is perpendicular to it (FIG. 1), and the principal axis system $z_1$, $z_2$, $z_3$, where $z_3$ is the optical axis. The angle of incidence is denoted as α. The wave vector and the vector normal to the interface x define the plane of incidence. δ is the angle between the incidence plane and the plane (x, z), and φ is the angle between x axis and the direction of $z_3$. Owing to the symmetry properties of uniaxial crystal, the y and $z_2$ axes may be taken to coincide without loss of generality. Then the unit vectors x, y and z are given in terms of $z_3$ and n (the unit vector normal to the interface) by the following relations.

$$x = n; \tag{1}$$

$$y = \frac{1}{f_n}(z_3 \times n); \text{ and} \tag{2}$$

$$z = \frac{1}{f_n}[n \times (z_3 \times n)]; \tag{3}$$

where the normalization factor is $f_n = |z_3 \times n| = [1-(z_3 \cdot n)^2]^{1/2}$.

FIG. 2 shows the multiple reflection inside the anisotropic thin film 12, wherein j, l, m=e, o, of which e is extraordinary wave, o is ordinary wave, $r_{sp}^{(a)}$ is reflection coefficient for S-polarized incident light and P-polarized reflected light on (a) interface, $r_{eo}^{(b)}$ is reflection coefficient for extraordinary incident light and ordinary reflected light on (b) interface, $t^{se(a)}$ is transmission coefficient for S-polarized incident light and extraordinary transmitted light on (a) interface; same for other symbols in the figure.

EX1. A typical anisotropic MgF$_2$ thin film 32 is arranged in prism (BK7) 31 that one of the principal axes at an angle of 45 deg to the normal of the interface. The principal indices of the anisotropic thin film 32 are $n_1$=1.280, $n_2$=1.253 and $n_3$=1.250. The anisotropic MgF$_2$ thin film 32 is 800 nm-thick. The s-polarized light of wavelength 632.8 nm propagates into the prism 31/anisotropic MgF$_2$ thin film 32/air system 33 (In FIG. 3). Under this condition, the polarization conversion reflectance $R_{sp}$ is increased to 0.95 at the angle of incidence of 54 deg and the incident plane orientation δ=90 deg. FIG. 4 shows the spectrum of reflectance $R_{sp}$ versus incident angle. FIG. 5 shows the spectrum of reflectance $R_{sp}$ versus wavelength at the incident angle 54 deg. The polarization conversion reflectance varies with changing the principal indexes of refraction and the directions of the principal axes of the anisotropic thin film 32. The anisotropic thin film 32 can be utilized to modulate the polarization of light at various wavelengths and angles of incidence.

EX2. Two isotropic thin films are arranged in a prism 61/isotropic ZnS thin film 62/anisotropic MgF$_2$ thin film (920 nm thick) 63/isotropic MgF$_2$ thin film 64/air system 65 (In FIG. 6) to narrow the band reflection polarization conversion. (The refractive index of the ZnS thin film 62 is 2.35 and the thickness is 73 nm; the refractive index of the isotropic MgF$_2$ 64 is 1.38 the thickness is 220 nm). The other optical constants in the system are as well as EX1. FIG. 7 shows the reflectance $R_{sp}$ spectrum at the incident angle α=53.0 deg and the incident plane orientation δ=90 deg (In FIG. 1). The polarization conversion reflectance varies with changing the principal indexes of refraction and the directions of the principal axes of the anisotropic thin film 63. The anisotropic thin film 63 can be utilized to modulate the polarization of light at various wavelengths and angles of incidence.

EX3. The broad-band polarization conversion reflection from the BK7 prism 81/isotropic MgF$_2$ thin film 82/anisotropic MgF$_2$ thin film 83 (800 nm thick)/air system 84 can be determined (In FIG. 8). The refractive index of the isotropic MgF$_2$ thin film 82 is 1.38 and the thickness is 190 nm. The thickness and optical constants of the anisotropic MgF$_2$ thin film 83 are as well as EX1. The polarization conversion reflectance $R_{sp}$ is increased with the angle of incidence of 54 deg and the incident plane orientation δ=90 deg (In FIG. 1). FIG. 9 shows the reflectance $R_{sp}$ spectrum. The polarization conversion reflectance varies with changing the principal indexes of refraction and the directions of the principal axes of the anisotropic thin film 83. The anisotropic thin film 83 can be utilized to modulate the polarization of light at various wavelengths and angles of incidence.

EX4. The narrow-band polarization conversion reflection from the prism 101/anisotropic MgF$_2$ thin film 102 (1700 nm thick)/isotropic ZnS thin film 103/air system 104 (incident angle α=56.7 deg and incident plane orientation δ=90 deg). The refractive index of the isotropic ZnS thin film 103 is 2.35 and the thickness is 170 nm and the other optical constants of the anisotropic MgF$_2$ thin film 102 are as well as EX1. FIG. 11 shows the spectrum of reflectance $R_{sp}$ versus wavelength. The polarization conversion reflectance varies with changing the principal indexes of refraction and the directions of the principal axes of the anisotropic thin film 102. The anisotropic thin film 102 can be utilized to modulate the polarization of light at various wavelengths and angles of incidence.

Based on the above, the optical configuration that generates polarization conversion uses different refractions and single oblique columnar configuration thin film to achieve optical polarization conversion. The modified design, such as change of incident and substrate medium, changing the number of layers of optical materials to three or more, using two optical materials with different refraction and one with low refraction as single oblique columnar configuration to achieve polarization conversion, are also discussed by the present invention.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims that are to be accorded with the broadest interpretation so as to encompass all such modifications and similar configurations.

What is claimed is:

1. An optical configuration for generating polarization conversion comprising:
    at least one anisotropic thin film having three principal axes and a surface, each principal axis respectively having an index of refraction, at least one index of refraction being different from others, each principal axis being not coincident with a normal of the surface;
    an incident medium; and
    a substrate;
wherein the anisotropic thin film is arranged between the substrate and the incident medium, such that interference phenomena is generated and reflectance of a P-polarized or S-polarized incident light internally reflected inside the anisotropic thin film is raised;
wherein when the P-polarized or S-polarized incident light gets into the optical configuration, the P-polarized incident light is converted into an S-polarized reflected light, or the S-polarized incident light is converted into a P-polarized reflected light.

2. The optical configuration according to claim 1, wherein if each index of refraction is different from each other, the at least one anisotropic thin film is a biaxial thin film.

3. The optical configuration according to claim 1, wherein if both indices of refraction are the same and different from the other, the at least one anisotropic thin film is a uniaxial thin film.

4. The optical configuration according to claim 1, wherein an index of refraction of the incident medium is larger than that of the substrate.

5. The optical configuration according to claim 4, wherein the substrate is air or metal.

6. The optical configuration according to claim 1, wherein at least one optical constant of the anisotropic thin film is determined by measuring a change of polarization conversion along with wavelength and incident angle.

7. The optical configuration according to claim 6, wherein the at least one optical constant of the anisotropic thin film comprises the indices of refraction, directions, and thickness of the principal axes.

* * * * *